April 26, 1955  K. L. HERTEL  2,706,904
APPARATUS FOR AND METHOD OF TESTING POROUS MATERIALS
Filed April 9, 1951  5 Sheets-Sheet 1
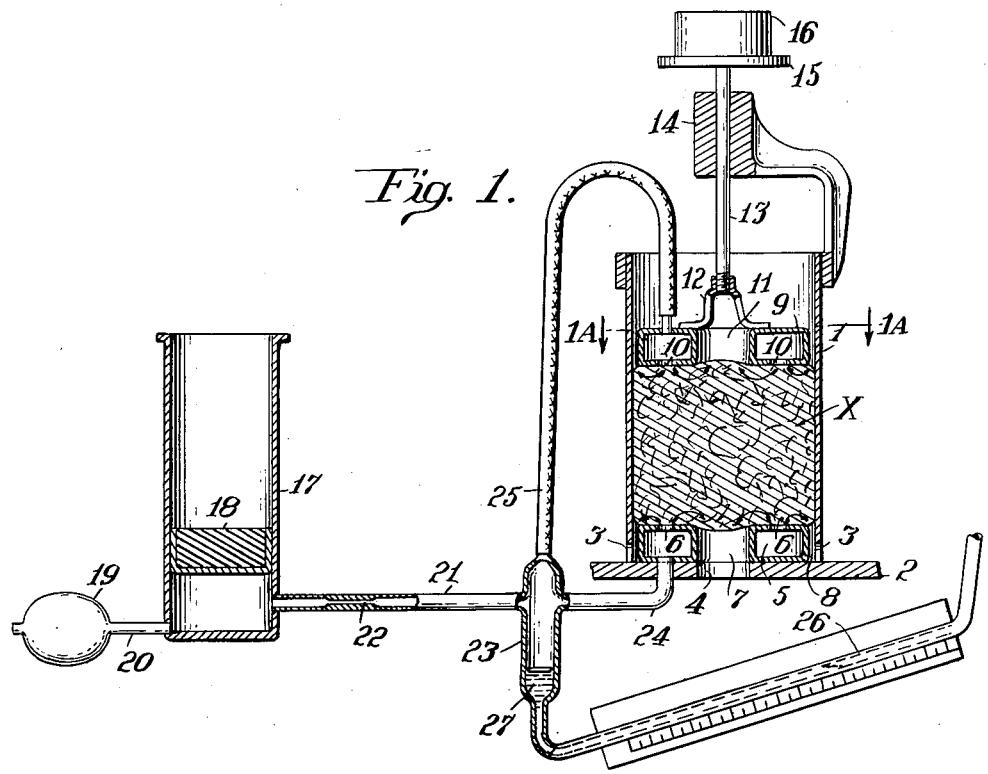
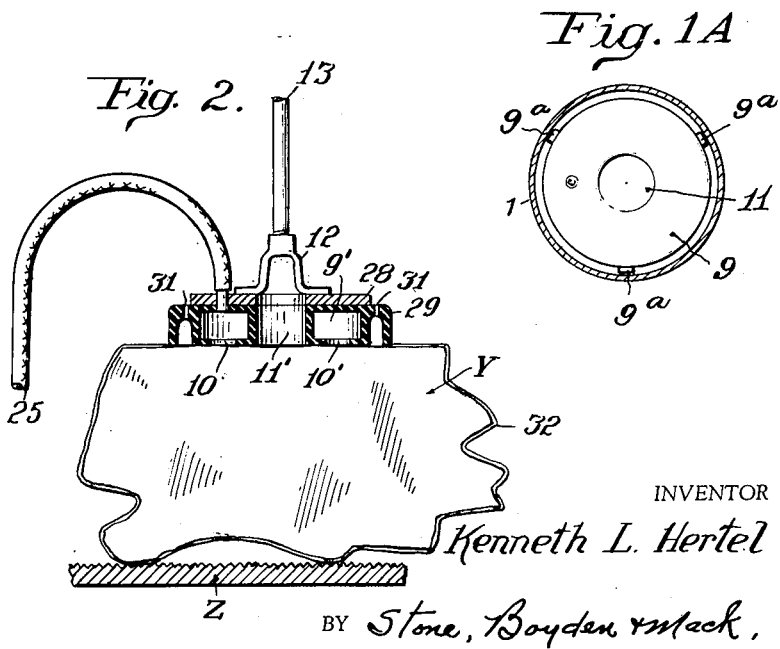
INVENTOR
Kenneth L. Hertel
BY Stone, Boyden & Mack,
ATTORNEY Inventor
Kenneth L. Hertel
Attorneys

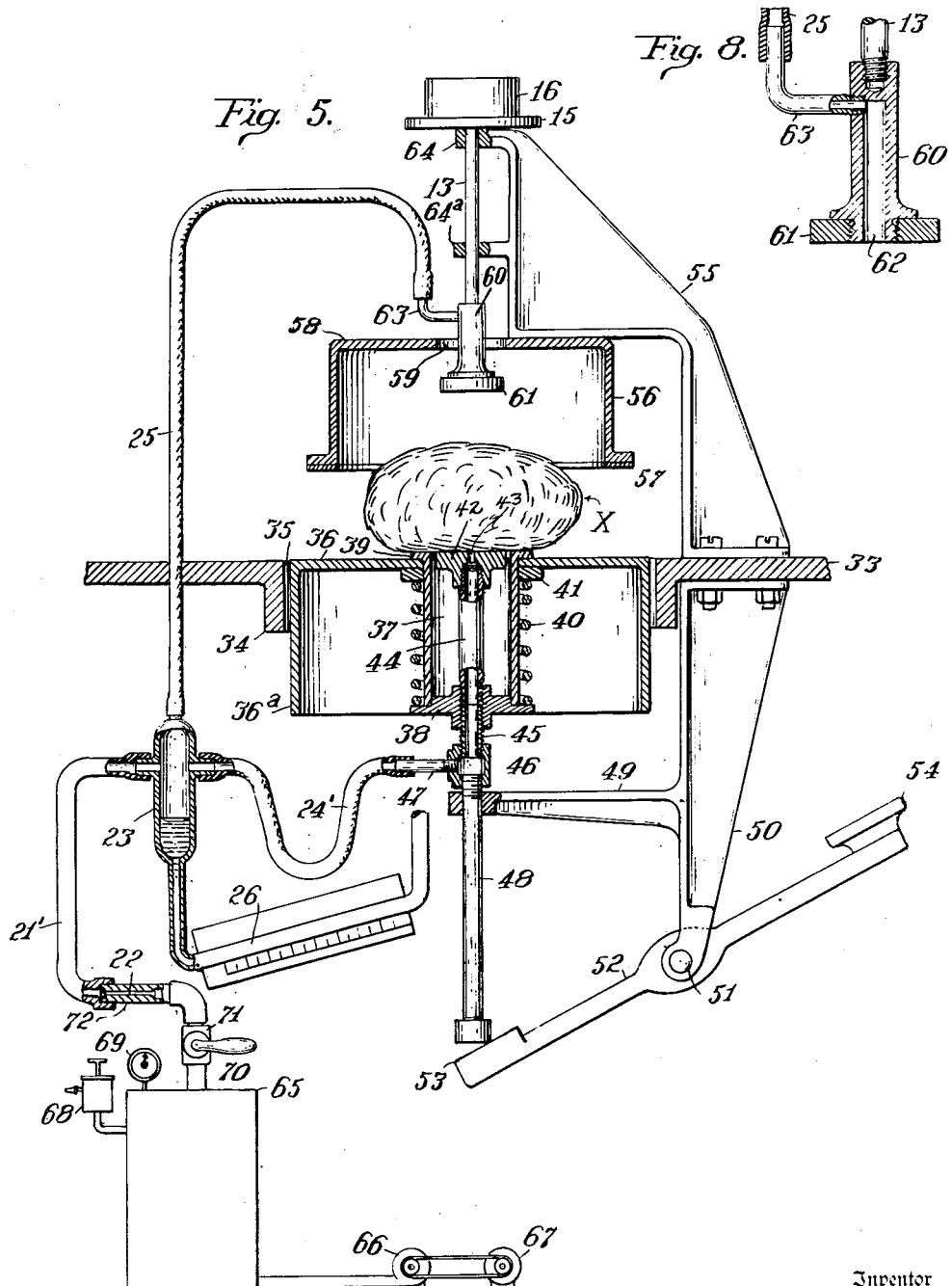

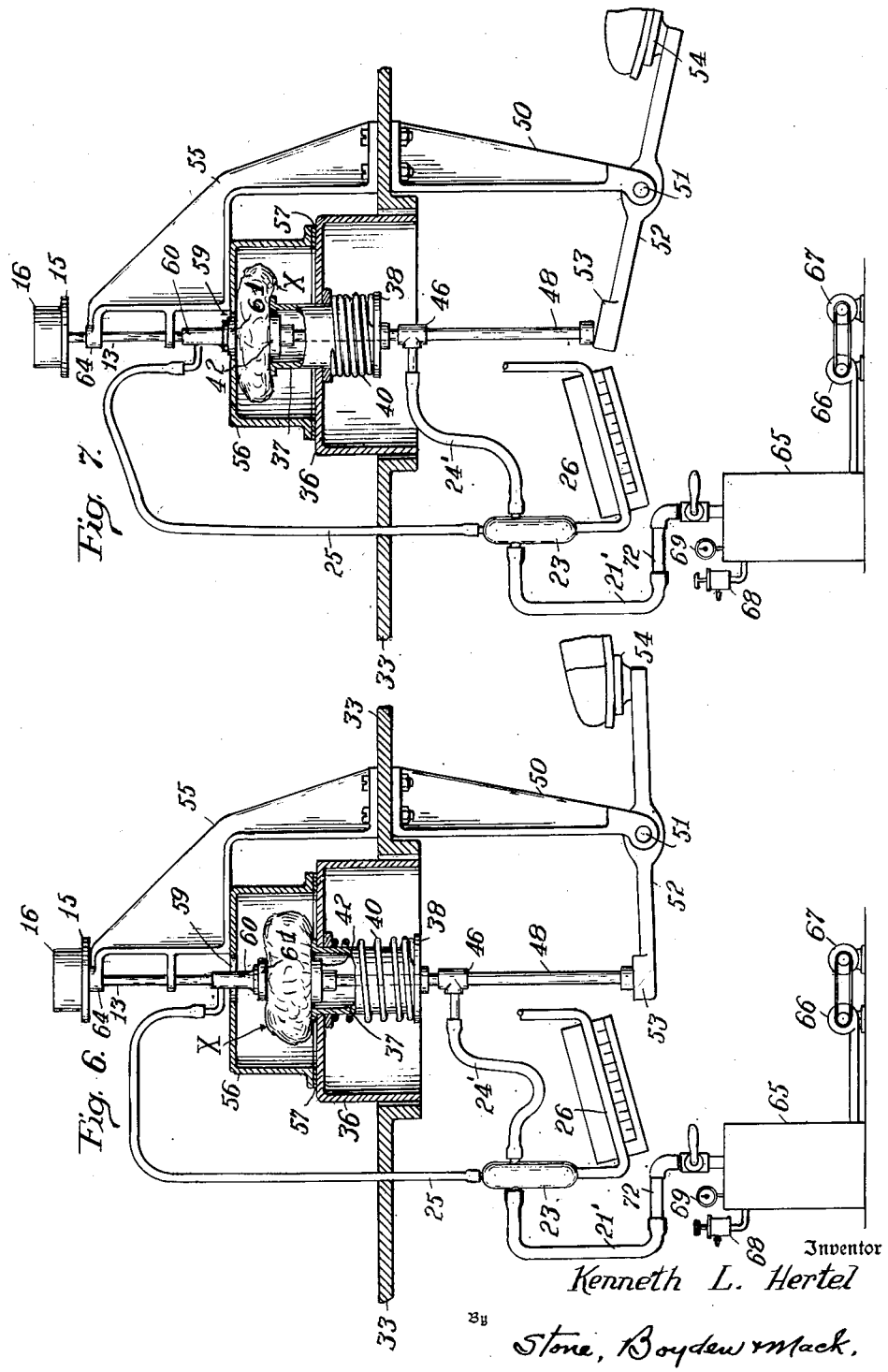

April 26, 1955 K. L. HERTEL 2,706,904
APPARATUS FOR AND METHOD OF TESTING POROUS MATERIALS
Filed April 9, 1951 5 Sheets-Sheet 5
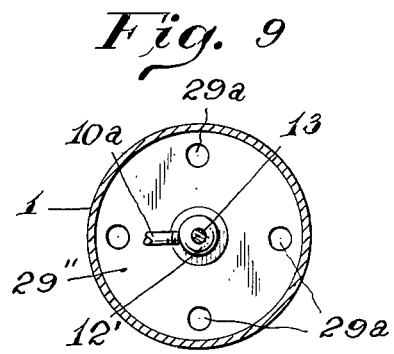
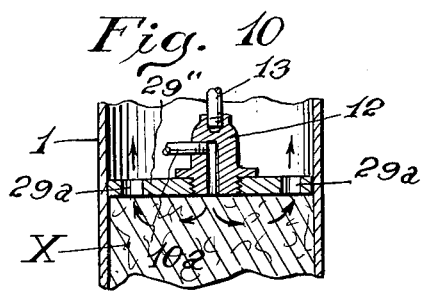
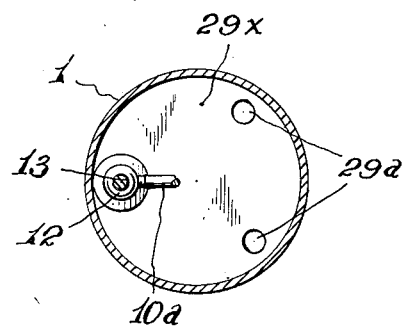
Inventor
Kenneth L. Hertel,
By Stone, Boyden & Mack,
Attorneys.

United States Patent Office 2,706,904
Patented Apr. 26, 1955

2,706,904

APPARATUS FOR AND METHOD OF TESTING POROUS MATERIALS

Kenneth L. Hertel, Knoxville, Tenn., assignor to University of Tennessee Research Corporation, Knoxville, Tenn., a corporation of Tennessee Application April 9, 1951, Serial No. 219,990

12 Claims. (Cl. 73—38)

This invention relates to apparatus for determining the relative permeability of various samples of porous materials, and more particularly to apparatus for measuring the resistance to fluid flow offered by such samples, in order that other factors related to this resistance may be determined.

In my prior Patents Nos. 2,352,835 and 2,352,836, issued July 4, 1944, I have disclosed a method of and apparatus for measuring the resistance offered by masses of finely divided or fibrous material to fluid flow for the purpose of determining the factor, among others, commonly known as "fineness."

Where the samples being tested are masses of fibrous material, the present invention contemplates determining the relative value, for different samples, of the factor of fineness as modified by another factor related to the property of stiffness.

In my above mentioned prior patents, it was necessary to measure the weight or mass of the sample of material being tested in order to determine, in terms of known quantities, the several desired factors, including "fineness."

An object of the present invention is to devise apparatus so constructed and arranged that the combined factors of relative fineness and stiffness can be compared or determined without the necessity of knowing the weight or mass of the various samples of fibrous material, thus providing a more rapid method, the only requirement being that the quantity used for the test must exceed a predetermined minimum.

Another object is to design an improved form of nozzle by which fluid under pressure is supplied to the sample being tested, such nozzle, with slight modification, being applicable for testing either masses of soft compressible, fibrous material, or samples of hard, incompressible, porous material such as sandstone, provided such hard samples have one flat face.

A still further object of the invention is to devise apparatus so arranged that successive samples of material can be tested with such ease and speed as to meet any commercial requirements which may be encountered.

In order that the invention may be readily understood, reference is had to the accompanying drawing forming part of this specification, and in which:

Fig. 1 is a vertical, longitudinal section through one form of my improved apparatus, designed for accurately testing fibrous material, parts being illustrated in elevation;

Fig. 1A is a sectional plan substantially on the line 1A—1B of Fig. 1;

Fig. 2 is a similar view of a slightly modified form of nozzle shown as applied to a sample of hard, porous material;

Fig. 5 is a view, partly in side elevation and partly in vertical section, showing apparatus especially designed for carrying out my improved method on a commercial scale, the parts being illustrated as in their normal or idle position;

Figs. 6 and 7 are views generally similar to Fig. 5, showing the same apparatus, but illustrating the parts in different successive positions;

Fig. 8 is a detailed section, on an enlarge scale, through one of the parts shown in Fig. 5.

Fig. 9 is a sectional plan view of another modified form of nozzle;

Fig. 10 is a fragmentary vertical central section through the nozzle and associated parts shown in Fig. 9; and Fig. 11 is a view similar to Fig. 9, but showing a still further modified construction of nozzle.

Figure 3:
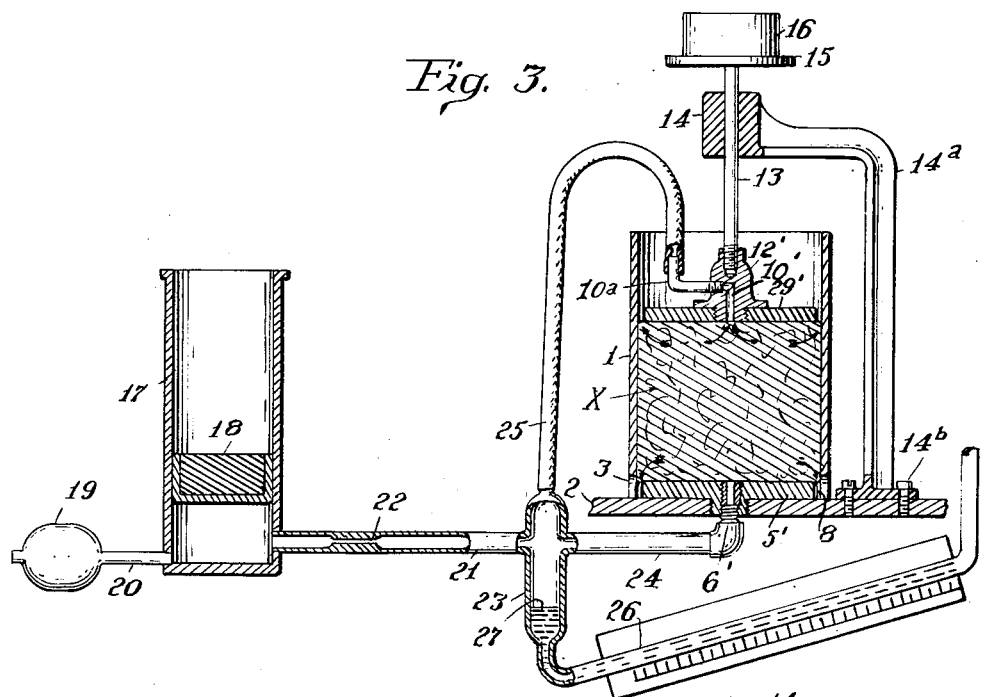
Fig. 3 is a view similar to Fig. 1 but showing a further modified form of nozzle.

Referring to the drawing in detail, and more particularly first to Fig. 1 thereof, I employ a cylindrical container 1 supported on a suitable base 2. At the bottom of the container are formed openings 3 for the escape of air and the base 2 is provided with an opening 4 for a purpose hereinafter described.

Resting upon the base 2 at the bottom of the cylinder is a hollow annular nozzle 5 having a flat upper face provided with an annular discharge slot, or opening 6, spaced a substantial distance from the outer edge thereof. The nozzle is formed with a central opening 7 which registers with the opening 4 in the base. This nozzle fits loosely within the cylindrical container so that a space or clearance 8 is provided between the sides of the nozzle and the walls of the container.

The sample X to be tested, consisting of a mass of soft compressible, fibrous material such as raw cotton, is placed within the container 1 and rests upon the upper surface of the nozzle 5.

I employ a second piston-like, hollow annular nozzle 9 similar to the nozzle 5, and fitting loosely within the cylinder. This nozzle 9 rests upon the top of the mass or sample X and is provided in its lower flat face with an annular discharge opening 10, spaced a substantial distance from the outer edge thereof. The nozzle 9 also has a central escape opening 11 communicating with atmosphere.

Both nozzles 5 and 9 are preferably provided around their periphery with a plurality of radially projecting lugs, such as illustrated at 9a in Fig. 1A, for the purpose of centering the nozzle in the container and providing a uniform annular space or passage between the sides of the nozzle and walls of the container for the escape of air.

It will be particularly noted that the discharge openings in the nozzles are spaced a substantial distance both from the escape openings 4 or 11, and from the annular passages around the peripheries of the nozzles.

Means are provided for exerting a constant downward pressure on the nozzle 9, such means being shown as consisting of a vertical rod 13 secured to a bracket 12 attached to the nozzle and sliding freely through a bearing 14. The rod carries at its upper end a platform 15 on which rests a weight 16.

From the foregoing it will be understood that the sample of fibrous material is compressed between the two nozzles. The pressure exerted on various successive samples is the same, namely that due to the weight 16, so that all samples are subjected to the same compressive force.

The apparatus further includes a fluid reservoir in the nature of a cylinder 17 in which freely slides a weighted piston 18. A rubber bulb aspirator 19 of conventional construction is connected with the bottom of this reservoir by means of a tube 20, so that when the aspirator is operated, air is compressed in the lower part of the cylinder 17 and as more air is forced in the weighted piston rises, so that the air in this reservoir is at all times under constant pressure, as determined by the weight 18.

From the lower part of the reservoir beneath the weighted piston 18, extends a tube 21, having a restricted or capillary passageway 22 as shown in my above mentioned patents. The tube 21 connects with a fitting 23 from which extend tubes 24 and 25 to the interior of the hollow nozzles 5 and 9 respectively, the tube 25 being made of rubber or other flexible material.

From the bottom of the fitting 23 extends an inclined manometer tube 26 associated with a suitable scale, such tube containing a liquid as indicated at 27. It will be obvious that the height to which the liquid rises in the manometer tube 26 depends upon the pressure existing in the fitting 23, which in turn is of course the pressure existing in the nozzles 5 and 9.

Air entering the nozzle 5 escapes through the annular opening 6 and from thence flows radially both inwardly and outwardly through a layer of fibrous material adjacent the nozzle, such air escaping both through the central opening 7 and through the space 8 and openings 3 to atmosphere.

Air entering the nozzle 9 at the top of the sample flows from the annular opening 10 radially both inwardly and outwardly through a layer of fibrous material adjacent the nozzle and escapes both through the central opening 11 and through the space between the sides of the nozzle and the walls of the container.

Thus, the only flow of air from the nozzles is radially through a layer of material in contact with the nozzles, and it will be particularly noted that the air leaves the sample or mass of material through the same surface by which it enters. Lateral flow is prevented by reason of the fact that the sample is confined within the cylinder 1 and axial flow is prevented by reason of the fact that the same air pressure is applied to opposite ends of the sample and thus balance one another. Since these pressures are equal, there is no tendency for any fluid flow axially or longitudinally of the sample. Furthermore, the area of escape of the air through the upper and lower surfaces of the sample is restricted and defined by the walls of the container.

From the foregoing it will be clear that due to the restricted passageway 22, the pressure which is maintained in the nozzles 5 and 9 depends upon the resistance to fluid flow presented by the layers of fibrous material adjacent the nozzles. If the material is relatively coarse and stiff it will be compressed by the weight 16 to only a relatively small extent, and consequently the resistance which it offers to fluid flow will be relatively small, and the air can escape rather freely from the nozzles so that a relatively low pressure will be indicated by the manometer.

If, on the other hand, the fibrous material is relatively soft and fine, it will be compressed to a much greater extent by the weight 16, and the resistance to fluid flow offered by the layers adjacent the nozzles will be much greater. Consequently, air can escape from the nozzles only slightly, and therefore the pressure indicated by the manometer will be proportionately higher. Thus the manometer gives readings which indicate the relative values of the combined factors of fineness and stiffness of the samples of fibrous material being tested.

In order to reduce the friction and facilitate the compression of the mass of fibrous material between the nozzles, I preferably rotate the container 1 (by means not shown) during the actual testing operation.

It will be understood that the exact size or weight of the mass of material is of no importance. It is immaterial whether the nozzles 5 and 9 are relatively close together or relatively far apart, since there is no axial or longitudinal flow through the sample, from one nozzle to the other, in any event. I have found in practice that if the container has a diameter of the order of 2½ inches, the layer of material at each end of the sample through which the air flows as described, is not more than approximately a quarter of an inch thick. Hence, a sample of any length sufficient to provide two ¼ inch layers will be satisfactory.

In Fig. 2 I have illustrated the application of the invention to a sample Y of hard incompressible material such as sandstone. This sample is shown as resting upon a support Z and as provided with a flat upper face.

The nozzle 9' which I employ in this modification is generally similar to the nozzle 9 shown in Fig. 1 except that it is preferably formed of soft, flexible material such as rubber. It has a flat end face which is provided with an annular opening 10', and is formed with a central opening 11'. The bracket 12 is secured to a plate 28 which rests upon the top of the nozzle.

In order to restrict and define the area of escape, in the same manner as such area is restricted and defined by the walls of the container in Fig. 1, I surround the nozzle 9' with a flange 29 spaced from the sides of the nozzle to provide an annular chamber 30, which communicates with atmosphere through openings 31.

In order to prevent axial flow of fluid through the sample or leakage which would render the results unreliable, all surfaces of the sample, except the area within the flange 29, should be rendered impervious as by coating with a suitable paint, as indicated at 32. By this means, the air from the nozzle 9' flows radially both inwardly and outwardly from the annular opening 10' through a layer of material in contact with the nozzle, and escapes both through the central opening 11' and through the chamber 30 and openings 31. It will be noted that, as before, the air escapes from the same surface of the sample which it enters and its escape through any other surface of the sample is positively prevented. The manometer reading will, of course, vary in proportion to the degree of permeability of the particular sample being tested.

While in Fig. 1, I have shown my improved nozzle as provided with an annular fluid discharge port or slot, and a central fluid escape opening, I also contemplate employing a nozzle having a single fluid discharge opening or port at the center thereof. This is illustrated in Fig. 3.

Referring to this figure, the same reference numerals have been used to indicate the parts corresponding with those of Fig. 1 and, as to these parts, no further description is necessary. Instead, however, of the hollow nozzle 5 shown in Fig. 1, I provide a solid disc-like nozzle 5', having a central port or opening into which is screwed a nipple 6' connected with the supply pipe 24.

Similarly, instead of the hollow nozzle 9, which rests on the top of the sample mass, I provide in Fig. 3 a solid disc-like nozzle 29' which is supported on a fitting 12' having a central port or discharge opening 10'. This connects with a nipple 10ᵃ to which the flexible hose 25 is secured.

In Fig. 3 the bearing 14, through which the rod 13 slides, is shown as carried by a bracket 14ᵃ secured to the table 2 by means of bolts 14ᵇ. With this construction, the container 1 is free to turn, and may be rotated, if desired, by any suitable means (not shown), as above mentioned.

The upper surface of the nozzle 5' and the lower surface of the nozzle 29' are flat, and the nozzles themselves fit loosely within the container so as to provide an annular fluid escape passage around the peripheries thereof, as shown and described in connection with Figs. 1 and 1A. As in these figures, the central delivery or supply ports are spaced a substantial distance from the annular escape passages. Fluid under pressure entering the ports 6' and 10' in the nozzles 5' and 29', respectively, will flow radially outward through layers of compressed porous material adjacent the flat surfaces of the respective nozzles, and will escape around the edges of such nozzles.

While, in Fig. 1, the fluid flows radially both inwardly and outwardly from the discharge ports or slots, in Fig. 3 the fluid flows outwardly only. The principle is the same however, since in both cases the fluid flows through a layer of material adjacent the respective nozzles, and, in Fig. 3, as in Fig. 1, the longitudinal or axial flow of fluid through the mass of material is prevented by reason of the fact that the fluid pressure at the ends of the sample is balanced.

Figure 4:
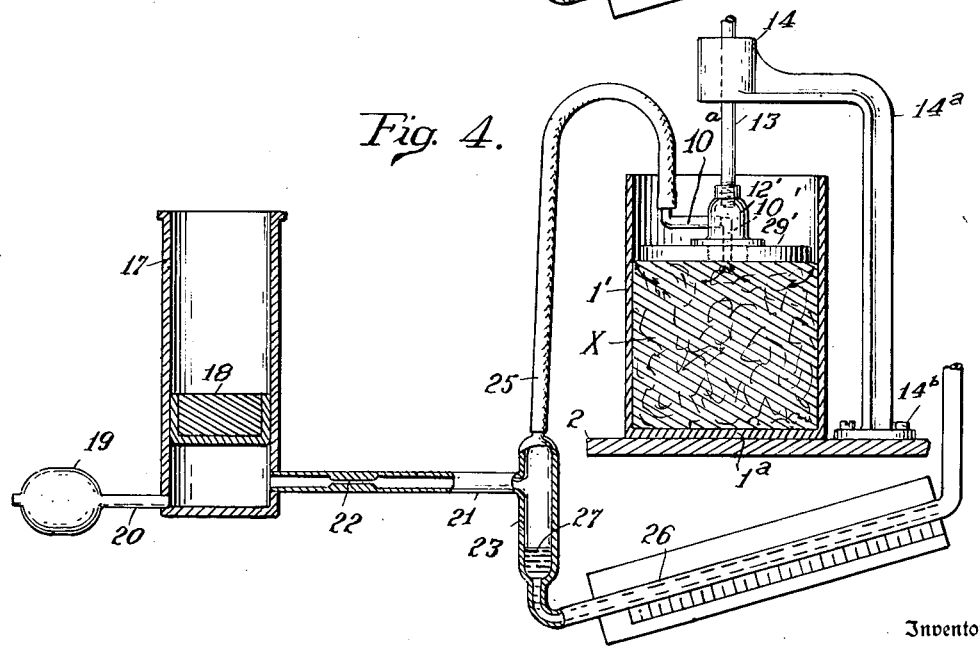
Fig. 4 is a similar view but showing a still further modified arrangement in which only a single nozzle is employed.

While in Figs. 1 and 3 I have shown, and prefer to use, a pair of opposed nozzles, as described, the same general results, although perhaps less accurate, can be obtained by the use of a single nozzle. This is illustrated in Fig. 4 in which the lower end of the container 1' is completely closed, as shown at 1ᵃ, and the only nozzle employed is the nozzle 29' which rests upon the top of the sample. Otherwise, the construction is identical with that shown in Fig. 3. The fluid flows radially outward from the central port or opening in the nozzle 29' through a layer of material adjacent the lower face of such nozzle, and escapes around the edges of the nozzle, as before. Fluid is prevented from flowing axially or longitudinally of the sample by reason of the fact that the bottom of the container is completely closed and no fluid can escape at that point.

It will of course be obvious that a single hollow nozzle having an annular discharge port, as shown in Fig. 1, can be used instead of the solid nozzle shown in Fig. 4, if desired.

While in Figs. 1, 3 and 4 I have shown what may be regarded as laboratory type apparatus, in Figs. 5 to 7 I have illustrated apparatus designed to be used commercially for testing successive samples of fibrous material with great ease and rapidity. This commercial apparatus embodies many of the same broad principles, as already described, in connection with the previous figures.

Referring first to Fig. 5, 33 designates any suitable table or platform having an opening 35, preferably surrounded by a depending flange 34. Fitting freely within this opening is a support 36, having a flat upper surface which, in the normal position of the parts, as shown in Fig. 5, lies substantially flush with the top of the table 33. The support 36 is preferably provided with a depending peripheral flange 36ª which serves to guide the same in the opening 35.

Passing through a central opening in the support 36, with a substantially airtight fit, is a cylinder 37 supported upon a piston or plunger 38. The upper end of the cylinder 37 terminates in a peripheral flange 39 which overlies the upper surface of the support 36. A helical spring 40 surrounds the cylinder 37 and bears at its lower end upon the piston 38 and, at its upper end, upon a ring 41, resting against the lower surface of the support 36.

A piston-like nozzle 42, having a central opening 43, is mounted within the cylinder 37 and fits loosely therein. The nozzle is carried by a short pipe 44, the lower end of which screws into the piston 38. This piston acts as a coupling to join the pipe 44 with another pipe 45 which extends down below the piston 38 and is joined by means of a T 46 with a third pipe 48. The pipes 44, 45 and 48 together constitute, in effect, a piston rod. A nipple 47 taps the T 46 and is connected with the flexible hose 24' which extends to the fitting 23, it being understood that similarly numbered parts are the same as in Fig. 1.

The pipe 48 is guided for vertical movement through a bearing carried by an arm 49, forming part of a bracket 50, depending from the lower side of the table 33 and secured thereto. To the lower end of the bracket 50 is pivoted, as at 51, a lever 52, one end 53 of which engages under the lower end of the pipe 48, while the other end is equipped with a treadle 54 to receive the operator's foot.

Supported on and extending upwardly from the table 33 is a second bracket 55 which carries spaced bearings 64 and 64ª through which the rod 13 vertically slides.

To the lower end of this rod is secured a nozzle comprising a body 60 with a disc-like member 61 at the lower end thereof. A port or passageway 62 extends up through the body 60, as shown in Fig. 8, and communicates with a nipple 63, to which one end of the flexible hose 25 is secured.

Supported at 58 on the bracket 55 is a dome-shaped cover 56 having a central opening 59 of such size that the disc 61 may pass freely therethrough with a substantial clearance. This dome or cover is provided at its lower edge with a sealing gasket 57.

Instead of supplying fluid under pressure by means of the laboratory type apparatus shown in Figs. 1 to 4, I provide in Figs. 5 to 7 a more commercial type of fluid pressure apparatus. This is illustrated as comprising a tank or container 65 connected with a pump 66 driven by a motor 67, the tank being equipped with an adjustable pressure valve 68 and with a pressure indicator or gage 69. Extending upwardly from the tank is a pipe 70 having therein a manually operated valve 71 to which is connected a fitting 72 having a restricted passageway 22 such as shown in Fig. 1. A tube 21' connects this fitting 72 with the fitting 23. Thus, air is maintained at constant pressure in the tank 65 and is fed through the restricted passageway 22 to the fitting 23 from which it is distributed through the hoses 24' and 25 to the discharge ports or openings 43 and 62 in the lower and upper nozzles, respectively.

In operation, the apparatus normally occupies the position shown in Fig. 5. In this position, the weight 16 is supported by the guide 64 which acts as a stop, and the nozzle 60 is in its lowermost position. A sample or mass of material X to be tested is shifted by the operator from the table 33 over the support 36 and onto the nozzle 42 as shown. The operator then depresses the pedal 54 so as to raise the piston 38, cylinder 37 and nozzle 42 together with the support 36, up into the elevated position shown in Fig. 6, in which position the sample X is confined between the two nozzles 42 and 60 within the dome or cover 56. In this position, the top of the support 36 engages the sealing gasket 57 so as to effect a fluid type joint.

The operator then continues to press down on the pedal 54, thus lifting the nozzle 42 and cylinder 37 up toward the position shown in Fig. 7. The cylinder 37 and nozzle 42 are permitted to move from the position shown in Fig. 6 to that shown in Fig. 7, by reason of the fact that the spring 40 yields and is compressed, as shown in Fig. 7, the force of the spring serving to resiliently hold the support 36 up against the gasket 57.

The operator continues to press down on the pedal until he observes that the weight 16 is being lifted. When this occurs, the mass or sample of fibrous material being tested is being compressed between the two nozzles with a force which is equal to the weight 16 and hence is the same for all successive samples. This assures that in every case the sample is compressed to the same extent, and the nozzles applied to the sample with the same force. In other words, as the pedal 54 moves downwardly and the nozzle 42 moves upwardly, the sample is in every case compressed until the force transmitted therethrough to the nozzle 60 is sufficient to lift the weight 16.

In the final position of the parts as shown in Fig. 7, it will be observed that the sample is pressed up against the top wall of the cover 58, and the disc-like nozzle 61 lies within the opening 59 therein. Just as in Fig. 1 the air from the nozzle 9 escapes through the annular space between the nozzle and the walls of the container, so in Fig. 7 the air from the port 62 escapes through the annular space between the periphery of the nozzle and the edge of the opening 59. In both cases, the nozzle is surrounded by an enclosing structure which is spaced from the nozzle to provide an annular passageway through which air may escape.

Similarly, air from the port 43 escapes through the annular space between the edge of the nozzle 42 and the walls of the cylinder 37. It will be understood, of course, that, also as in Figs. 1, 3 and 4, the fluid flows radially outwardly from the ports 43 and 62 through layers of the fibrous material adjacent the disc-like nozzles. Any tendency of the air to flow longitudinally of the sample from face to face is prevented by reason of the fact that the fluid pressure at these opposite faces is balanced the same as in Figs. 1 and 3. And any flow of the air outwardly beyond the areas of the nozzles is reduced to a minimum by reason of the fact that any such seepage into the inside of the sealed dome or cover 58 would tend to raise the pressure therein, so that the pressure is lowest at the escape zones immediately surrounding the peripheries of the nozzles, as, for example, at the opening 59.

When the weight is lifted, as above described, the operator knows that the proper compressive force has been applied to the sample and he thereupon takes his reading from the manometer 26. The readings of this manometer, as successive samples are tested, indicate the pressure existing at the discharge ports in the two nozzles, and variations in this pressure of course indicate corresponding variations in the permeability of the samples being tested.

While in the preceding figures I have shown nozzles so arranged that air escape passages are provided around the peripheries of the nozzles, the invention is not limited to such an arrangement. Other constructions of nozzles may also be employed, the only essential thing being that the discharge or delivery port must be located a substantial distance from the fluid escape passage so that the fluid will flow laterally through the layer of compressed material adjacent the flat face of the nozzle.

Thus, in Figs. 9 and 10, I have shown a modified form of nozzle 29", generally similar to that illustrated in Figs. 3 and 4, but having a plurality of fluid escape openings 29ª extending through the same, and spaced a substantial distance from the central delivery or discharge port 10'. In this modification, the piston-like nozzle makes a close fit with the cylinder 1. The fluid discharged from the central port flows radially out through the layer of fibrous material adjacent the flat face of the nozzle, the same as in Figs. 3 and 4, and escapes through the openings 29ª.

It is not necessary, however, for the delivery or discharge port to be located centrally of the nozzle. In Fig. 11, I have illustrated a still further modified construction of nozzle in which both the discharge port 10', and escape ports 29ª, are disposed near the edge of the nozzle, but at widely separated points on opposite sides thereof. Here also, the nozzle 29ˣ fits the cylinder tightly. With such an arrangement, fluid flows from the delivery or discharge port laterally through the layer of material adjacent the flat face of the nozzle to the escape passages 29ª as before.

What I claim is:
1. Apparatus for determining the relative permeability of various samples of porous material comprising an annular hollow nozzle having a central escape opening and a flat face provided with an annular discharge opening spaced inwardly from the outer edge of said nozzle, means for pressing the flat face of said nozzle against the sample to be tested, means for delivering fluid under constant pressure through a restricted passageway into said hollow nozzle, whereby said fluid flows radially both inwardly and outwardly from said annular discharge opening through a layer of material adjacent said nozzle and escapes both through said central opening and around the outside of said nozzle from the same surface of said sample as that which it enters, means for preventing flow of fluid through said sample in any other direction, and means for indicating the pressure existing in said nozzle.

2. Apparatus for determining the relative permeability of various samples of porous material comprising an annular hollow nozzle having a central escape opening and a flat face provided with an annular discharge opening spaced inwardly from the outer edge of said nozzle, means for pressing the flat face of said nozzle against the sample to be tested, means for delivering fluid under constant pressure through a restricted passageway into said hollow nozzle, whereby said fluid flows radially both inwardly and outwardly from said annular discharge opening through a layer of material adjacent said nozzle and escapes both through said central opening and around the outside of said nozzle from the same surface of said sample as that which it enters, means surrounding and spaced from said nozzle for defining the fluid escape area around the outside thereof, and means for indicating the pressure existing in said nozzle.

3. Apparatus for determining the relative permeability of various samples of porous material comprising an annular hollow nozzle having a central escape opening and a flat face provided with an annular discharge opening spaced inwardly from the outer edge of said nozzle, means for pressing the flat face of said nozzle against the sample to be tested, means for delivering fluid under constant pressure through a restricted passageway into said hollow nozzle, whereby said fluid flows radially both inwardly and outwardly from said annular discharge opening through a layer of material adjacent said nozzle and escapes both through said central opening and around the outside of said nozzle from the same surface of said sample as that which it enters, means for absolutely preventing flow of fluid through said sample in any other direction and its escape from any other surface, and means for indicating the pressure existing in said nozzle.

4. Apparatus for determining the relative permeability of various samples of fibrous material comprising a pair of annular hollow nozzles each having a central escape opening and an end face provided with an annular discharge opening spaced inwardly from the outer edge of said nozzle, means for compressing a sample of fibrous material between the said end faces of said nozzles with a pressure that is the same for every sample, means for laterally confining the sample so compressed, said confining means being spaced from the periphery of said nozzle to provide an escape passage, means for delivering fluid under constant pressure through a restricted passageway simultaneously into both hollow nozzles, whereby pressure at the opposite ends of said sample is balanced and longitudinal flow through the sample is prevented, and whereby fluid flows radially both inwardly and outwardly from said annular discharge openings through a layer of material adjacent each nozzle, and escapes both through said central openings and around the outside of said nozzles from the same surface of said sample as that which it enters, and means for indicating the degree of pressure existing in said nozzles.

5. Apparatus for determining the relative permeability of various samples of fibrous material, comprising a cylindrical container, an annular hollow nozzle loosely fitting said container, said nozzle having a central escape opening and an end face provided with an annular discharge opening, means for pressing said end face of said nozzle against the surface of a mass of fibrous material confined within said container with a constant pressure, means for delivering fluid under constant pressure through a restricted passageway into said hollow nozzle, whereby fluid flows radially both inwardly and outwardly from said annular opening through a layer of material adjacent said nozzle and escapes both through said central opening and around the outside of said nozzle from the same surface of said mass as that which it enters, means for preventing fluid from flowing axially of said mass, and means for indicating the degree of pressure existing in said nozzle.

6. Apparatus for determining the relative permeability of various samples of fibrous material comprising a cylindrical container, a piston-like nozzle loosely fitting said container and having a central opening and a flat face, means for pressing said face of said nozzle against the surface of a mass of fibrous material confined within said container, with a constant force, means for delivering fluid under constant pressure through a restricted passageway to said central opening, whereby fluid flows radially outward from said opening through a layer of material adjacent said nozzle and escapes around the outside edges of said nozzle from the same surface of said mass as that which it enters, means for preventing fluid from flowing from said opening axially through said mass, from end to end, and means for indicating the degree of pressure existing at said central opening.

7. Apparatus for determining the relative permeability of various samples of fibrous material comprising a cylindrical container, a piston-like nozzle loosely fitting said container and having a flat face and a fluid discharge port opening through said face at a point spaced a substantial distance from the outer edge thereof, means for pressing said face of said nozzle against the surface of a mass of fibrous material confined in said container, with a constant force, means for delivering fluid under constant pressure through a restricted passageway to said port, whereby fluid flows radially outward from said port through a layer of material adjacent said nozzle and escapes around the outside edges of said nozzle from the same surface of said mass as that which it enters, means for preventing fluid from flowing from said opening axially through said mass from end to end, and means for indicating the degree of pressure existing at said port.

8. Apparatus for determining the relative permeability of various samples of fibrous material, comprising a pair of alined disc-like nozzles each having a flat face and a fluid discharge port opening through said face at a point spaced a substantial distance from the outer edge thereof, means for compressing a sample of fibrous material between the said flat faces of said nozzles with a force that is the same for every sample, means for laterally confining the sample so compressed, said confining means being spaced from the periphery of said nozzles to provide escape passages, means for delivering fluid under constant pressure through a restricted passageway simultaneously to the ports of both nozzles, whereby fluid pressure at the opposite ends of said sample is balanced and longitudinal flow through the sample is prevented, and whereby fluid flows radially outward from said ports through a layer of material adjacent each nozzle, and escapes around the outside of said nozzles from the same surface of said sample as that which it enters, and means for indicating the degree of pressure existing at said discharge ports.

9. Apparatus for determining the relative permeability of various samples of fibrous material, comprising a pair of alined disc-like nozzles each having a flat face and a fluid discharge port opening through said face at a point spaced a substantial distance from the outer edge thereof, means for compressing a sample of fibrous material between the said flat faces of said nozzles with a force that is the same for every sample, means for delivering fluid under constant pressure through a restricted passageway simultaneously to the ports of both nozzles, an enclosing structure surrounding said nozzles but spaced therefrom to provide an escape passage, whereby fluid pressure at the opposite ends of said sample is balanced and longitudinal flow through the sample is prevented, and whereby fluid flows radially outward from said openings through a layer of material adjacent each nozzle through said passage, and escapes around the outside of said nozzles from the same surface of said sample as that which it enters, and means for indicating the degree of pressure existing at said discharge openings.

10. Apparatus for determining the relative permeability of various sample masses of compressible fibrous material comprising a disc-like nozzle having a flat face and a fluid delivery port opening through said face at a point spaced a substantial distance inwardly of the outer edge thereof, an enclosing structure surrounding said nozzle and spaced from the periphery thereof to provide an annular opening for the escape of fluid, means for pressing the flat face of said nozzle with a constant force against the surface of a mass of fibrous material within said enclosing structure, means for delivering fluid under constant pressure through a restricted passageway to said port, whereby fluid flows radially outward from said port through a layer of material adjacent said nozzle and escapes around the outside edges of said nozzle through said annular opening from the surface of said mass as that which it enters, means for preventing fluid from flowing from said port axially through said mass from end to end, and means for indicating the degree of fluid pressure existing at said delivery port.

11. The method of determining the relative permeability of various masses of compressible fibrous material, which comprises compressing each mass between opposing flat surfaces of equal and substantial area with a force which is the same for all, simultaneously introducing fluid from a source of constant pressure into opposite faces of said mass at points near the center of each area, whereby the fluid pressure at opposite ends of said mass is balanced and longitudinal flow through said mass is prevented, and whereby fluid is caused to flow laterally out from the center of each area through a layer of compressed material adjacent each flat surface, and comparing the degrees of fluid pressure existing at the points of introduction of fluid into successive masses.

12. Apparatus for determining the relative permeability of various sample masses of porous material comprising a disc-like nozzle having a flat face and a fluid delivery port opening through said face, an enclosing structure surrounding said nozzle and arranged to provide a passage between itself and said nozzle whereby fluid issuing from said port may escape from said structure, means for pressing the flat face of said nozzle with a constant force against the surface of a porous mass to be tested, means for delivering fluid under constant pressure through a restricted passageway to said port, said port being so located that a portion of the flat face of said nozzle in contact with the surface of the porous mass being tested lies between said port and said escape passage, so as to space them a substantial distance apart, whereby fluid flows laterally from said port through a layer of material adjacent said nozzle and escapes from the same surface of said mass as that which it enters, means for preventing fluid from flowing axially through said mass from end to end, and means for indicating the degree of fluid pressure existing at said delivery port.

References Cited in the file of this patent

UNITED STATES PATENTS

| | | |
|---|---|---|
| 2,157,135 | Little et al. | May 9, 1939 |
| 2,348,985 | Lewis | May 16, 1944 |
| 2,352,835 | Hertel | July 4, 1944 |
| 2,352,836 | Hertel | July 4, 1944 |
| 2,417,988 | Mooney | Mar. 25, 1947 |
| 2,484,507 | Hertel | Oct. 11, 1949 |
| 2,539,355 | Reichertz | Jan. 23, 1951 |
| 2,659,433 | Brown | Nov. 17, 1953 |

FOREIGN PATENTS

| | | |
|---|---|---|
| 875,738 | France | June 29, 1942 |